UNITED STATES PATENT OFFICE.

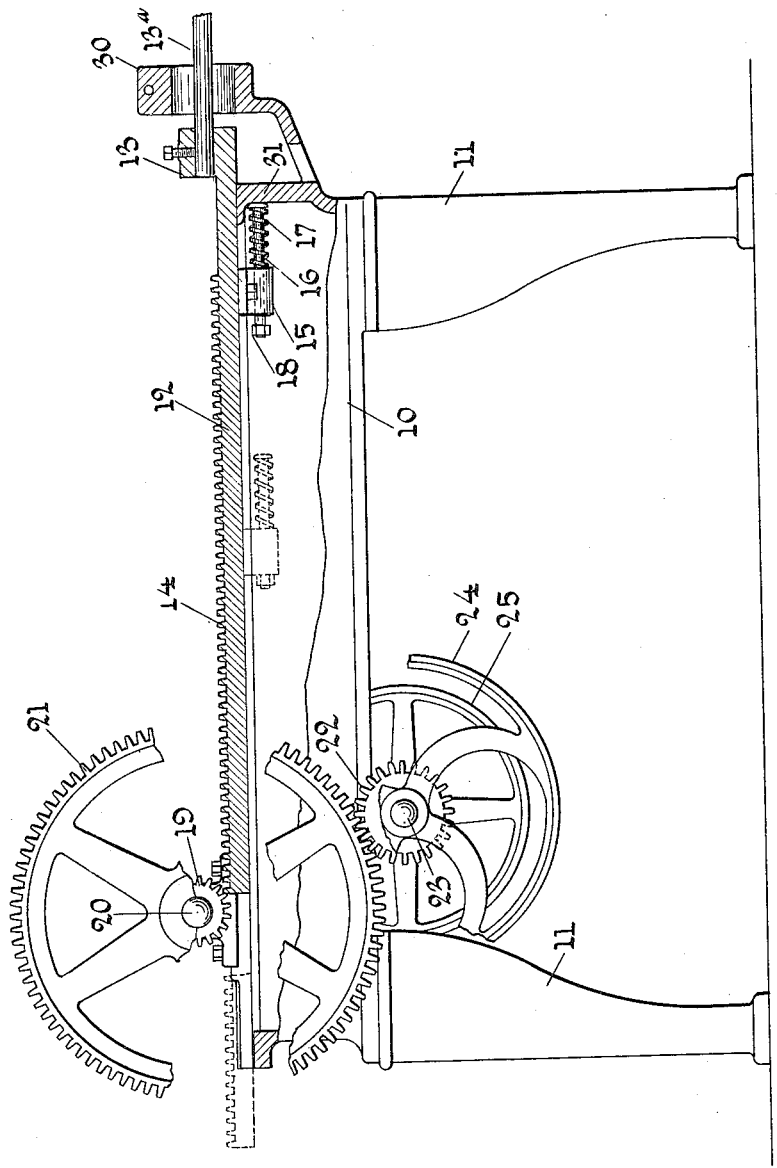

CHESTER HACKING, OF PAWTUCKET, RHODE ISLAND, ASSIGNOR TO CROMPTON & KNOWLES LOOM WORKS, OF WORCESTER, MASSACHUSETTS, A CORPORATION OF MASSACHUSETTS.

KEY-SEATING MACHINE.

1,132,179.   Specification of Letters Patent.   Patented Mar. 16, 1915.

Application filed August 13, 1914. Serial No. 856,538.

*To all whom it may concern:*

Be it known that I, CHESTER HACKING, a citizen of the United States, residing at Pawtucket, in the county of Providence and State of Rhode Island, have invented a new and useful Key-Seating Machine, of which the following is a specification.

This invention relates to a key seating machine and to other similar machines in which a longitudinally movable tool is operated through a rack and pinion drive. In machines of this type it is customary to limit the length of the rack in order that it may be impossible to force the rack longitudinally into contact with fixed portions of the machine. It often happens that the driving pinion is not reversed at the proper moment and the rack is thus moved out of working relation to the pinion before the pinion is stopped or reversed. It is then necessary to move the rack bar manually until it again engages the pinion. If the pinion is rotating in a reverse direction, the teeth of the pinion or of the rack are often damaged by this method of procedure, as it is impossible to bring the parts into coöperation in any predetermined relation.

It is the object of my invention to provide means for automatically returning the rack into position to engage the pinion and for insuring that the parts shall be in operative relation to each other when thus engaged.

With this object in view, my invention contemplates the provision of means for yieldingly forcing the rack bar toward the driving pinion, so that the rack shall immediately engage the pinion in proper operative relation when the rotation of the pinion is reversed.

My invention further consists in certain devices, arrangements and combinations of parts which will be hereinafter described and more particularly pointed out in the appended claims.

A preferred form of my invention is shown in the drawing, which is a side elevation of my improved machine with portions thereof shown in section.

The machine comprises a frame 10 supported upon legs 11 and having a rack bar 12 mounted to slide longitudinally thereon. The bar 12 is provided with a head 13 within which the tool 13ᵃ may be secured. The rack bar 12 is also provided with a series of teeth 14 upon its upper face and with a depending projection 15 within which a rod or plunger 16 is longitudinally movable. A coiled spring 17 surrounds the rod 16 and forces it yieldingly toward the right, as viewed in the drawing. A nut or collar 18 upon the rear end of the rod 16 limits its longitudinal movement.

The driving means for the rack bar 12 comprises a pinion 19 mounted upon a shaft 20 supported on the frame 10 and having a large gear 21 secured thereto. The gear 21 meshes with a pinion 22 mounted upon the shaft 23 supported below the frame 10 and having driving pulleys 24 and 25 thereon. Straight and cross belts (not shown) coöperate with the pulleys 24 and 25 to rotate the shafts 23 and 20 and to thus move the rack bar 12 longitudinally. Provision is made whereby the pulleys 24 and 25 may be driven to rotate the shafts 23 and 20 in either direction at the will of the operator. A bracket 30 extends beyond the right-hand end of the frame 10 and provides a support for the work upon which the machine is to operate. As the rack bar is moved to the right upon its working stroke and approaches its extreme right-hand or forward position, the plunger 16 contacts with a fixed stop 31, which is shown in the drawings as an integral part of the frame 10. Further movement of the rack bar to the right compresses the spring 17 which thereafter tends to force the rack bar to the left in order to relieve the spring tension. In this way the rack teeth at the rear end of the rack bar are forced yieldingly toward the pinion and are in position to immediately coöperate with the teeth of the pinion upon its reversal. As shown in the drawing, the rear tooth of the rack bar is forced yieldingly against the side of one of the teeth of the pinion. If this tooth rises above the path of the rack tooth, the rack will immediately be forced to the left until the rear tooth contacts with the next following tooth in the pinion. The rack bar is substantially in mesh with the pinion at all times, and is started on its rearward movement as soon as the pinion is reversed. No attention on the part of the operator is required to return the rack bar to operative relation with the pinion.

Having thus described my invention, it will be evident that changes and modifications can be made therein by those skilled in the art without departing from the spirit and scope of my invention as set forth in the claims, and I do not wish to be limited to the details herein disclosed, but

What I claim is:—

1. In a machine of the class described, in combination, a frame, a pinion rotatably mounted in said frame, means to drive said pinion in two directions, a longitudinally movable tool, a rack bar supporting said tool, normally meshing with said pinion and movable thereby, said rack bar being slidable in said frame into a position out of engagement with said pinion, and a spring-pressed plunger mounted on said rack bar and engaging a fixed stop on the frame as the rack bar approaches the end of its working stroke, said plunger being effective to insure engagement of the rack teeth with the pinion when the direction of rotation of the pinion is reversed.

2. In a machine of the class described, in combination, a frame, a pinion rotatably mounted in said frame, means to drive said pinion in two directions, a longitudinally movable tool, a rack bar supporting said tool, normally meshing with said pinion and movable thereby, said rack bar being slidable in said frame into a position out of engagement with said pinion, a yielding member and a fixed member, one of said members being mounted on said rack bar and said members coöperating to yieldingly force the teeth on said rack bar into engagement with said pinion when the rotation thereof is reversed.

3. In a machine of the class described, in combination, a frame, a pinion rotatably mounted in said frame, means to drive said pinion in two directions, a longitudinally movable tool, a rack bar supporting said tool, normally meshing with said pinion and movable thereby, said rack bar being slidable in said frame into a position out of engagement with said pinion, and means to yieldingly force said rack bar rearwardly toward said pinion, thereby causing the teeth in the rack bar to engage said pinion as the pinion is reversed.

4. In a machine of the class described, in combination, a frame, a pinion rotatably mounted in said frame, means to drive said pinion in two directions, a longitudinally movable tool, a rack bar supporting said tool, normally meshing with said pinion and movable thereby, said rack bar being slidable in said frame into a position out of engagement with said pinion, and means to automatically restore the operative relations between said bar and said pinion at the reversal of the pinion.

5. In a machine of the class described, in combination, a frame, a pinion rotatably mounted in said frame, means to drive said pinion in two directions, a longitudinally movable tool, a rack bar supporting said tool, normally meshing with said pinion and movable thereby, said rack bar being slidable in said frame into a position out of engagement with said pinion, a depending projection on said rack bar, a rod slidable therein, and a spring normally forcing said rod away from said pinion, whereby when said rod engages a fixed portion of the machine the reaction of said spring forces the rack bar yieldingly rearward and is effective to insure coöperative engagement of the teeth of said rack bar with said pinion when the rotation of the pinion is reversed.

In testimony whereof I have hereunto set my hand, in the presence of two subscribing witnesses.

CHESTER HACKING.

Witnesses:
J. F. BROWNING,
V. W. FALLOW.

Copies of this patent may be obtained for five cents each, by addressing the "Commissioner of Patents, Washington, D. C."